Nov. 19, 1968  B. J. WALLIS  3,411,636
TRANSFER DEVICE
Original Filed Dec. 14, 1964  7 Sheets-Sheet 1

INVENTOR.
BERNARD J. WALLIS
BY
*Barnes, Kisselle, Raisch & Choate*
ATTORNEYS

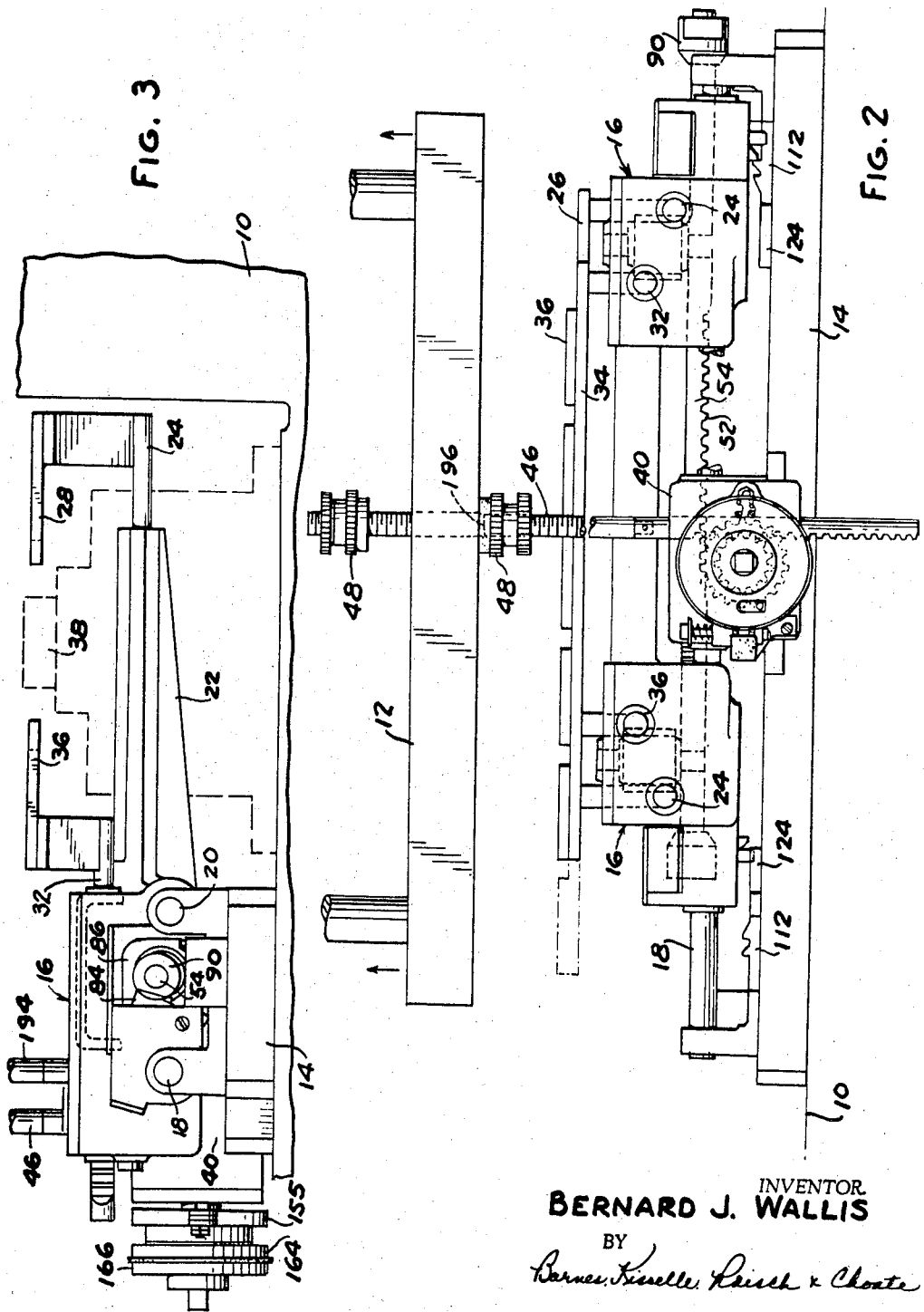

INVENTOR.
BERNARD J. WALLIS
BY
ATTORNEYS

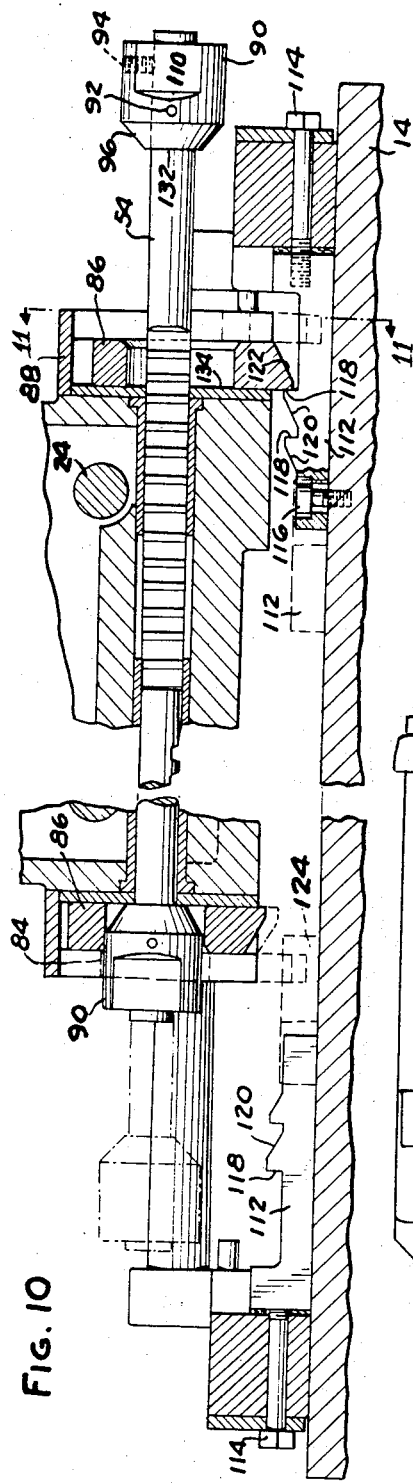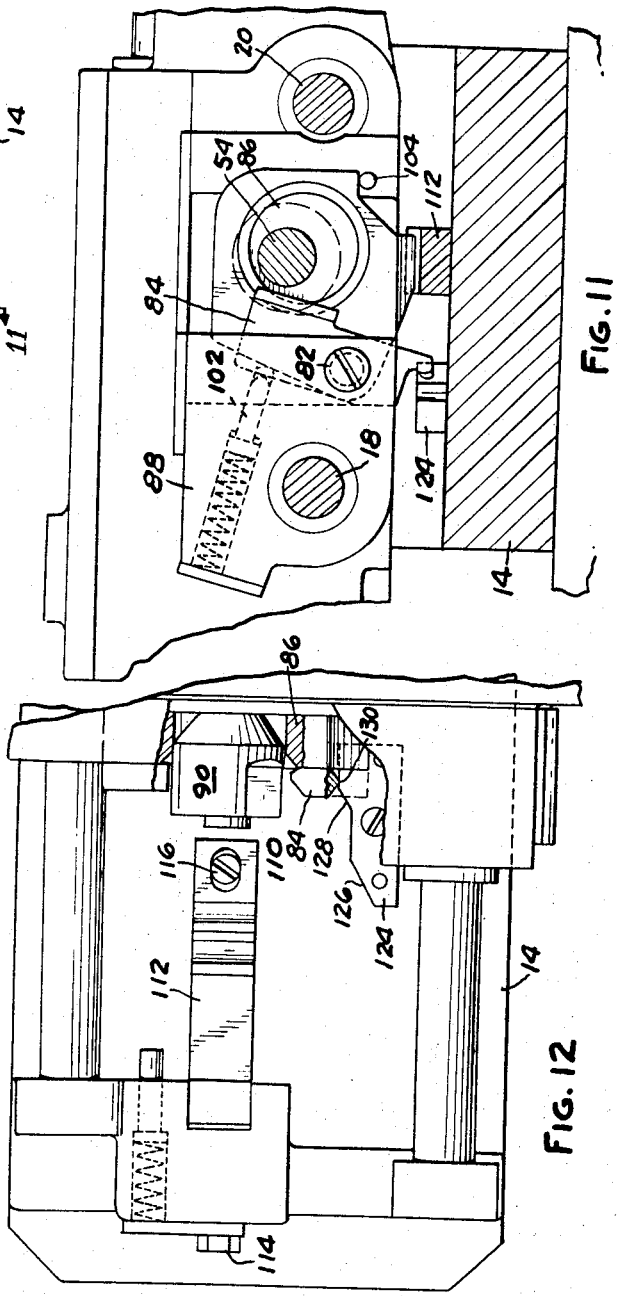

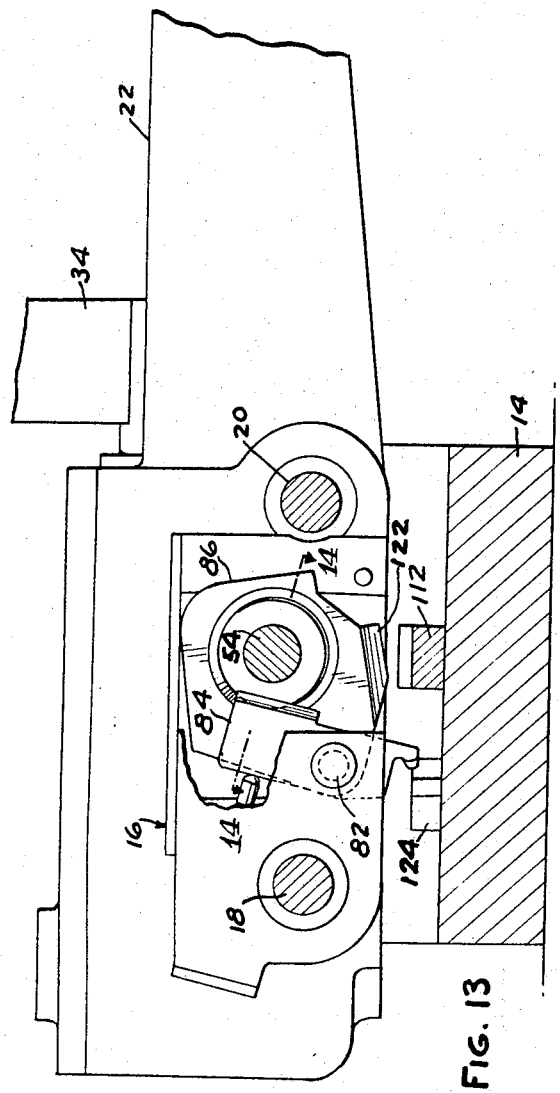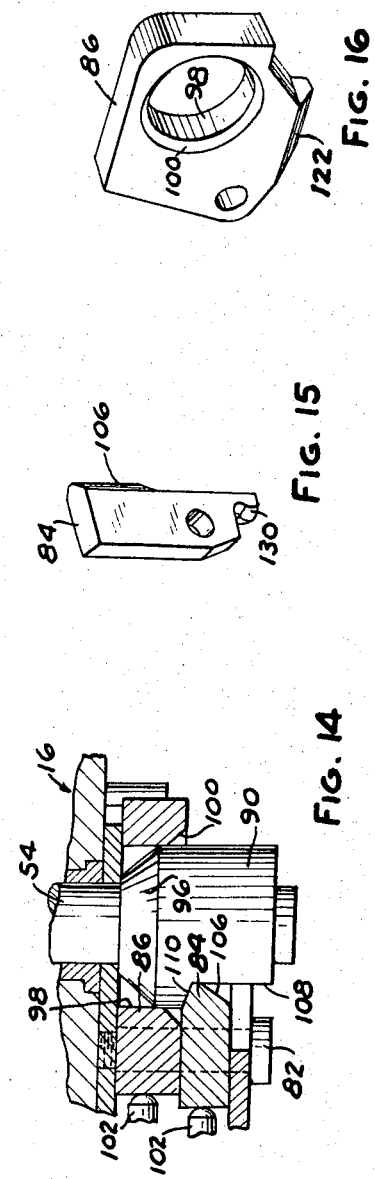

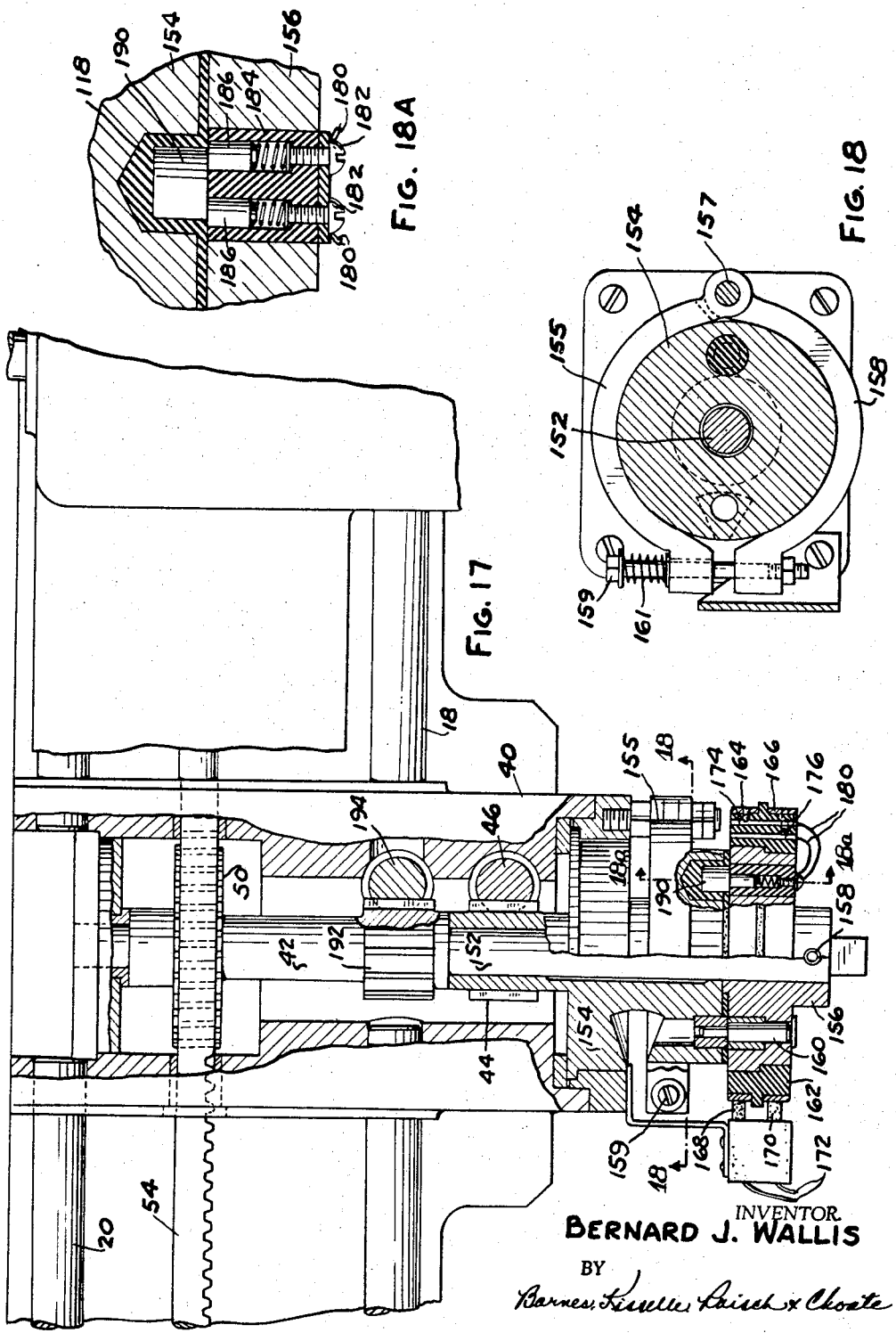

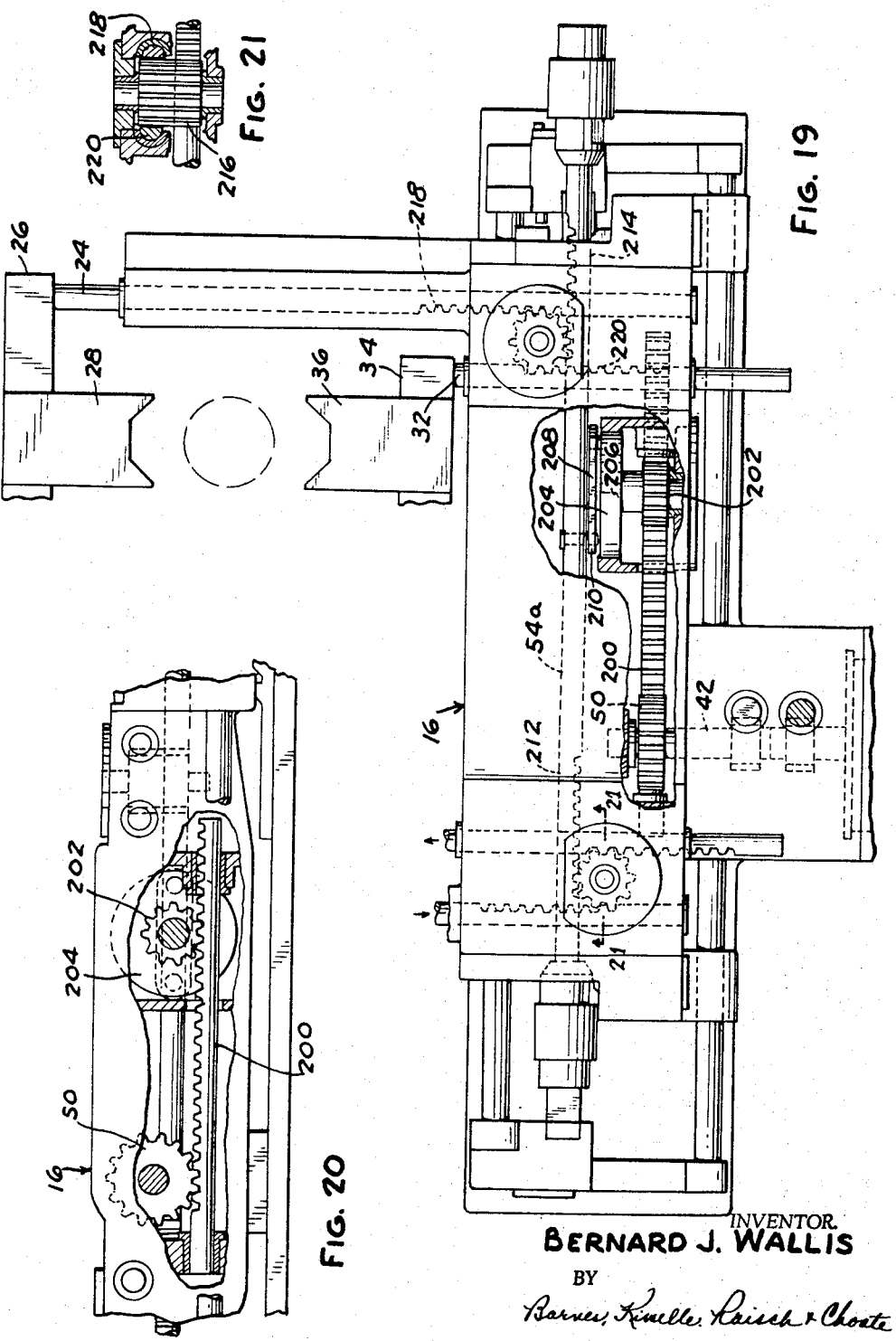

United States Patent Office 3,411,636
Patented Nov. 19, 1968

1

3,411,636
TRANSFER DEVICE
Bernard J. Wallis, 25200 Trowbridge Ave.,
Dearborn, Mich. 48124
Continuation of abandoned application Ser. No. 418,179,
Dec. 14, 1964. This application Apr. 12, 1966, Ser. No.
542,073
15 Claims. (Cl. 214—1)

ABSTRACT OF THE DISCLOSURE

A device for indexing workpieces progressively through a plurality of stations in the form of a carriage mounted on a base for reciprocation in a straight path and having a plurality of work-gripping fingers projecting from one side thereof in a direction transverse to the reciprocating path of the carriage with means for actuating the work-gripping fingers toward and away from each other so as to grip and release workpieces as the carriage reciprocates between successive stations.

This application is a continuation of my co-pending application Ser. No. 418, 179, filed Dec. 14, 1964, now abandoned.

This invention relates to a transfer device, and more particularly to a device for indexing workpieces progressively through a plurality of stations such as in the case of a progressive die in a punch press.

It is an object of this invention to provide a transfer device of the type described which is of relatively simple construction and economical in cost.

A further object of the invention resides in the provision of a transfer device which is compact in size so as to occupy a minimum of space and which is designed so that access to only one side thereof is required for servicing the device.

A further object of the invention resides in the provision of a transfer device which incorporates a drive mechanism that provides a smooth accelerating and decelerating motion to the workpieces being transferred by the device.

In the drawings:

FIG. 2 is a front elevational view of the transfer device shown in FIG. 1.

FIG. 3 is an end view of the transfer device.

FIG. 10 is a fragmentary sectional view with parts broken away, along the line 10—10 in FIG. 1.

FIG. 11 is a fragmentary sectional view along the line 11—11 in FIG. 10.

FIG. 12 is a fragmentary plan view, with parts broken away, of one end of the transfer device.

FIG. 13 is a view similar to FIG. 11 and showing the parts in a somewhat different position.

FIG. 14 is a fragmentary sectional view along the line 14—14 in FIG. 13.

FIGS. 15 and 16 are perspective views of the latch members shown in FIG. 13.

FIG. 17 is a fragmentary top plan view, with parts broken away, illustrating the safety shutoff arrangement for the device.

2

FIG. 18 is a sectional view along the line 18—18 in FIG. 17.

FIG. 18a is a sectional view along the line 18a—18a in FIG. 17.

FIG. 19 is a plan view, with parts broken away, of a modified form of transfer device according to the present invention.

FIG. 20 is a fragmentary, side-elevational view, with parts broken away, of the modified construction shown in FIG. 20.

FIG. 21 is a sectional view along the line 21—21 in FIG. 19.

Figure 1:
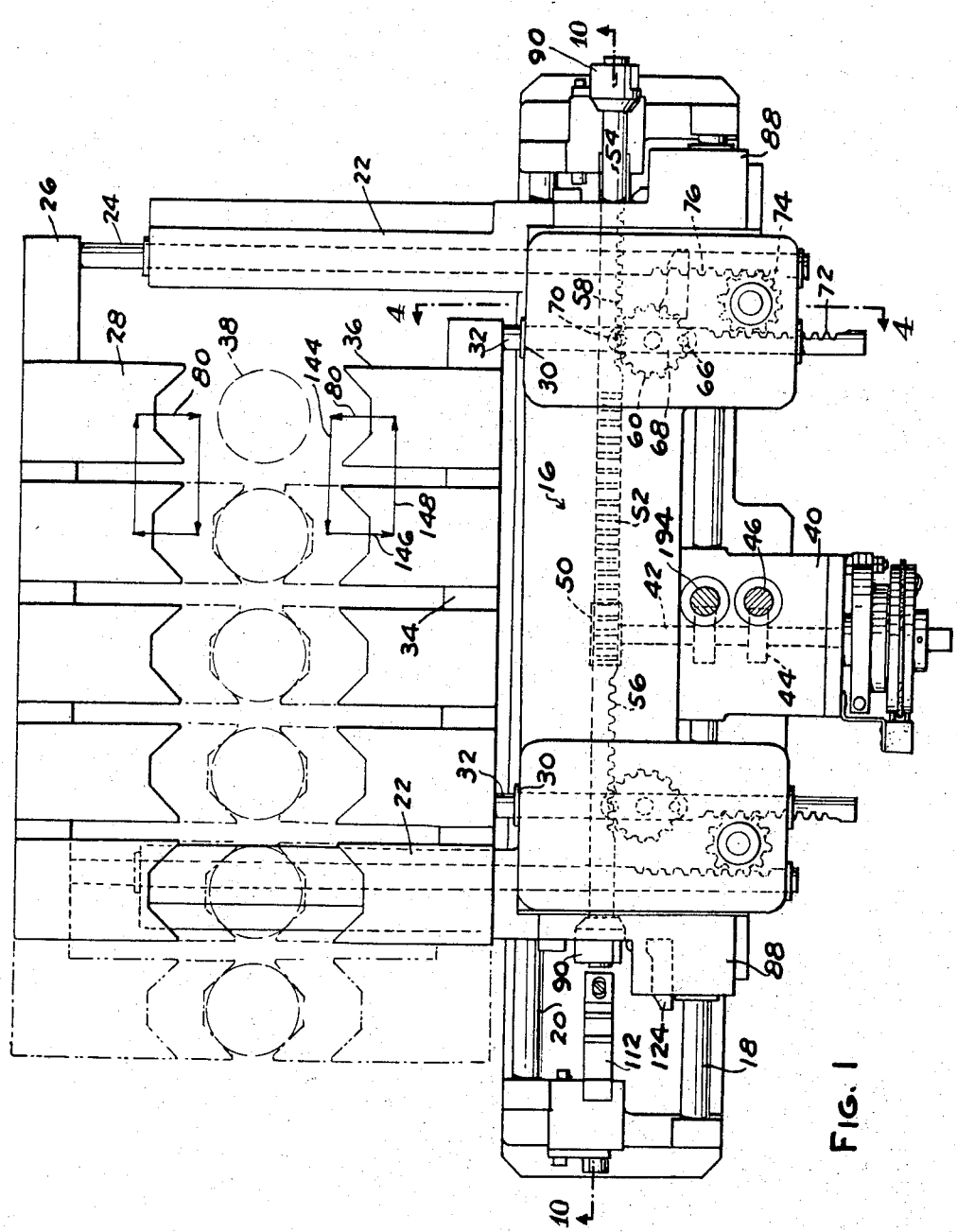
FIG. 1 is a top plan view of a transfer device embodying the present invention.
Figure 4:
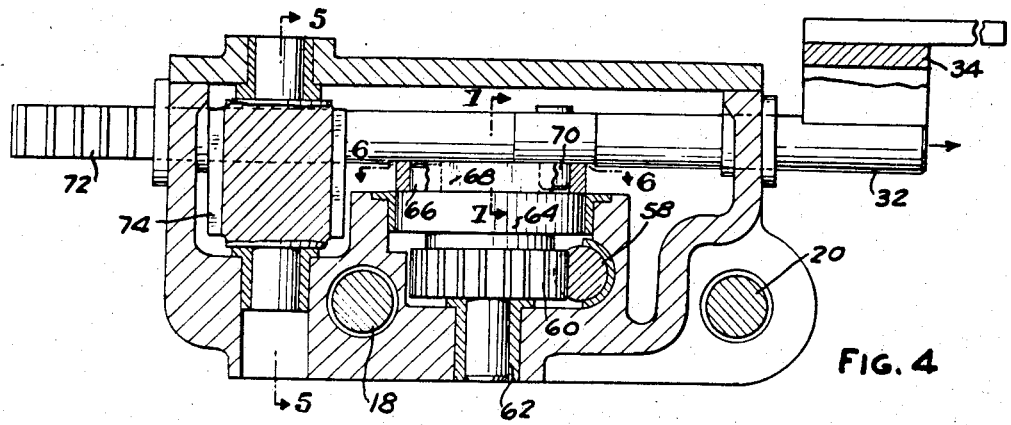
FIG. 4 is a sectional view along the line 4—4 in FIG. 1.
Figure 5:
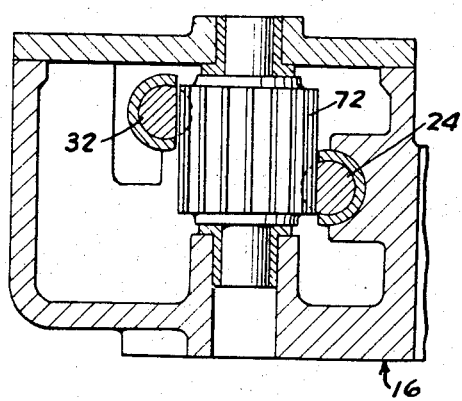
FIG. 5 is a sectional view along the line 5—5 in FIG. 4.
Figure 6:
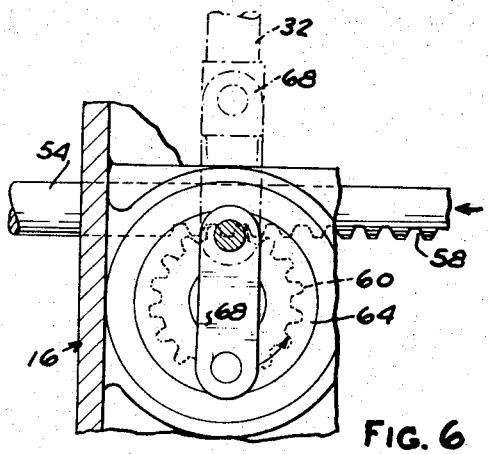
FIG. 6 is a sectional view along the line 6—6 in FIG. 4.
Figure 8:
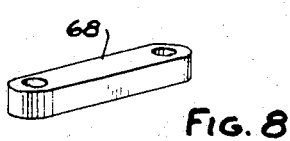
FIG. 8 is a perspective view of the link shown in FIGS. 4 and 6.
Figure 7:
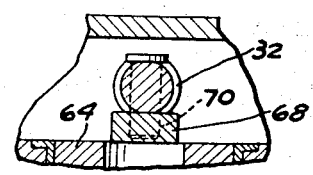
FIG. 7 is a sectional view along the line 7—7 in FIG. 4.
Figure 9:
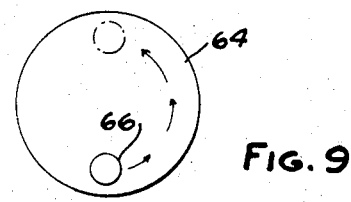
FIG. 9 is a plan view of the circular crank shown in FIGS. 4 and 6.

Referring to the drawings, and particularly to FIGS. 1 through 9, the transfer device of the present invention is shown mounted on the bed 10 of a press having a vertically reciprocating ram, a portion of which is shown at 12. The transfer device includes a base 14 mounted on the bed 10 of the press. A carriage 16 is mounted for reciprocation on base 14 by means of guide rods 18 and 20 (FIG. 1). As is shown in FIGS. 1 and 2, carriage 16 has a pair of laterally projecting hollow arms 22 at one side thereof. Within each arm 22 there is slidably arranged a rod 24. The outer ends of rods 24 are interconnected by a finger bar 26 on which a plurality of work-gripping fingers 28 are fixedly mounted. The same side of carriage casting 16 is also provided with a pair of bushings 30 in which a second set of rods 32 are slidably received. The outer ends of rods 32 are interconnected by a finger bar 34 on which a plurality of work-gripping fingers 36 are fixedly mounted. As is illustrated in FIGS. 1 and 2, the work-gripping fingers 28, 36 are aligned in the same horizontal plane and are aligned transversely of the device so as to be capable of gripping workpieces 38 located therebetween when the two sets of work-gripping fingers are moved toward each other.

Carriage 16 comprises a hollow casting on which is mounted a drive housing 40. Housing 40 projects from carriage 16 on the side thereof opposite the work-gripping fingers 28, 36. Within drive housing 40 there is journalled a shaft 42 connected, by means hereinafter disclosed, with a pinion 44 which meshes with a vertically extending gear rack 46. The upper end of rack 46 extends through a portion of ram 12 of the press and is interconnected therewith by means of adjustable stop nuts 48. With this arrangement, as the ram 12 travels vertically it drives rack 46 vertically and in turn rotates shaft 42. Shaft 42 has a pinion 50 fixed thereon which meshes with a gear rack portion 52 on a horizontally extending actuator bar 54. When the press ram 12 descends it engages the lower stop nuts 48 to shift rack 46 downwardly, which in turn causes actuator bar 54 to be shifted in a direction toward the right, as viewed in FIGS. 1 and 2. In FIGS. 1 and 2 the various parts are illustrated in the position they assume when the press ram 12 has reached its lowermost position. By the same token, when the press ram 12 rises, it engages the upper set of stop nuts 48 and actuator bar 54 is shifted through pinion 50 in the direction toward the left as viewed in FIGS. 1 and 2.

Actuator bar 54 is guided for sliding movement on carriage casting 16 and is provided with two gear rack portions 56, 58. The gear rack portions 56, 58 are designed to shift the finger bars 26, 34 laterally toward and away from one another. Since these two mechanisms are constructed and operate identically, only one need be described.

Referring now to FIGS. 4 through 9, which illustrate the drive arrangement of which the gear rack portion 58 forms a part, the gear rack portion 58 of actuator bar 54 meshes with a pinion 60 journalled on carriage 16 as at 62 for rotation about a vertical axis. Pinion 60 has formed integrally and concentric therewith a round boss 64 provided with a crank pin 66 at one side thereof. The link 68 engages pin 66 at one end and at its other end link 68 engages a pin 70 on the finger bar supporting rod 32. The inner end of rod 32 is formed with a gear rack portion 72 which meshes with a pinion 74. Pinion 74 in turn meshes with a gear rack portion 76 formed on the inner end of the other finger bar supporting rod 24. With the above-described arrangement, it will be appreciated that when actuator bar 54 is shifted to the left as viewed in FIG. 1, relative to carriage 16, pinion 60 is rotated in a counterclockwise direction and acting through link 68 shifts rod 32 and the finger bar 34 mounted thereon in a direction outwardly away from carriage 16. At the same time pinion 74 is rotated in a clockwise direction and through its engagement with the rack portion 76 shifts rod 24 and the finger bar 26 mounted thereon in a direction toward the carriage casting 16. Thus the two finger bars 26, 34 and the fingers mounted thereon are caused to move toward each other into clamping engagement with the workpieces 38 arranged therebetween. This movement of the finger bars is designated diagrammatically by the arrows 80 in FIG. 1.

The gear ratios of the various pinions and racks are designed such that upon each full stroke of the press ram the two pinions 60 are rotated through 180°. Thus, with the fingers in the fully retracted position, as shown in FIGS. 1 through 6, links 68 are axially aligned with rods 32 and assume the position illustrated in FIGS. 4 and 6 so as to lock the fingers in the retracted position. When the press ram rises to its topmost position, pinion 60 rotates in a counterclockwise direction, as viewed in FIG. 1, so as to cause the fingers 28, 36 to assume the dotted line position indicated in FIG. 1 to grip the workpieces. In this position of the fingers links 68 assume the broken line position illustrated in FIG. 6 to lock the work-gripping fingers in the work-clamping position.

It will be observed that the particular crank connection between the drive pinions 60 and the two finger bar supporting rods 32, 24 is such that the work-engaging fingers 28, 36 are provided with a smooth, accelerating and decelerating motion toward and away from one another. In other words, these work-engaging fingers are approaching zero velocity when they reach the fully retracted position and when they reach the work-clamping position. The work-engaging fingers attain their maximum velocity at the midportion of their stroke.

Referring now to FIGS. 10 through 16, it will be noted that at each end of carriage 16 there is pivotally supported, as by a screw 82, a pair of latches 84, 86. These two latches are shown in detail in FIGS. 15 and 16. Latches 84, 86 are partially enclosed by cover plates 88 at each end of carriage 16. At its opposite ends, actuator bar 54 is provided with stop bushings 90. Bushings 90 are accurately located lengthwise of actuator bar 54 and are locked in place by dowels 92 and set screws 94. The end faces of stop bushings 90 which are disposed toward the carriage 16 are chamfered as at 96 to form cam surfaces. Actuator bar 54 extends through an aperture 98 in latch 86. The edge of aperture 98 which faces its adjacent stop bushings 90 is chamfered as at 100 to provide a cam surface on each latch 86 adapted to be engaged by the cam surface 96 on each stop bushing 90. Each of the latches 84, 86 are biased in a clockwise direction, as viewed in FIGS. 11 and 13, by spring-pressed plungers 102. Thus, when either of the stop bushings 90 is spaced axially away from its associated latches 84, 86 the two latches assume the position illustrated in FIG. 11, the aperture 98 of latch 86 being eccentric relative to its associated stop bushing 90 and resting against the stop pin 104.

With the latches in the position illustrated in FIG. 11, when their associated stop bushings 90 shift in a direction toward them, the cam surface 96 on stop bushing 90 engages the cam surface 100 on latch 86 and the cam surface 106 on latch 84 to pivot the two latches in a counterclockwise direction to the positions shown in FIG. 13. As is best illustrated in FIG. 14, each stop bushing 90 is provided with a relieved portion 108 which terminates in a shoulder 110 behind which latch 84 is adapted to engage to lock the actuator bar with respect to the carriage 16.

Referring specifically to FIG. 10, it will be observed that adjacent each end of base plate 14, there is mounted a locking bar 112. Each bar 112 is mounted on base 14 for adjustment longitudinally of the carriage by means of an adjusting screw 114, and the bars 112 are adapted to be fixedly clamped in adjusted positions by means of screws 116. Each of these locking bars 112 is fashioned with one or more shoulders 118 provided by cam surfaces 120. The lower edge of latch 86 is likewise provided with a cam surface 122 which, when the carriage moves to one end of its stroke, is adapted to ride over cam surfaces 120 and eventually engage behind the endmost shoulder 118, as shown in FIG. 10, to lock the carriage at each end of its stroke.

There is also mounted adjacent each end of base plate 114 a latch release cam 124. Each cam 124 is provided with successive cam surfaces 126, 128 which are adapted to engage the heel 130 of latches 84.

The latch arrangement herein described has a dual function. Latch 86 is provided for locking the carriage 16 at opposite ends of its stroke on base 14, while latches 84 interlock the actuator bar 54 with carriage 16 while the carriage is being shifted from one end of its stroke to the other. In the position indicated in FIGS. 10 and 12, it will be observed that the two latches 84, 86 at the left end of the device are released. Latch 86 is spaced beyond its associated lock bar 112 and latch 84 has its heel 130 engaged by cam 124 so that it is rotated to a position wherein it clears shoulder 110 on stop bushing 90.

At the right end of the device, as viewed in FIGS. 10 and 12, it will be observed that latch 86 is engaged behind the end shoulder 118, and latch 84 is spaced from its release cam 124.

Thus, with the parts in the positions shown in FIGS. 10, 11 and 12, when the actuator bar 54 shifts in a direction to the left the cam surface 96 on the stop bushing 90 at the right engages the cam surface 106 of its latch 84 and then cam surface 100 of its latch 86 to pivot both latches associated therewith in a counterclockwise direction, as viewed in FIG. 13. The arrangement is such that when the leading end face 132 strikes the wear plate 134 on the adjacent right end of carriage 16, latch 84 has engaged behind the shoulder 110 stop bushing 90, as shown in FIG. 14, and latch 86 has been pivoted to clear the shoulder 118 of lock bar 112. It will be appreciated that while actuator bar 54 is moving to the left from the position shown in FIG. 10 relative to carriage 16, fingers 28, 36 are being shifted inwardly toward each other, as previously described. When the stop bushing 90 engages the wear plate 134, the carriage as a whole starts moving to the left, as viewed in FIG. 10, on the guide bars 18, 20. At this time the workpieces 38 are being indexed one station to the left and the path of movement is diagrammatically illustrated by the arrow 144 in FIG. 1.

As the carriage approaches the left end of its stroke, as viewed in FIG. 10, latch 86 at the left engages behind the endmost shoulder 118 of the lock bar 112 at the left, while at the same time the heel 130 of latch 84 at the right engages the release cam 124 at the right end to cause latch 84 to clear the shoulder 110 of the stop bushing 90 at the right end of actuator 54. The carriage is thus locked at the left end of its stroke and bar 54 is released for its next successive stroke to the right. At this time the press ram is at the uppermost end of its stroke.

As the ram descends, the operations just described are reversed, that is, first the actuator bar 54 shifts to the right relative to the carriage 16 to retract the fingers 28, 36 to the solid line position shown in FIG. 1, and thereafter carriage 16 is shifted in the direction toward the right to the position shown in FIG. 10. The path of movement of the fingers in the retracting direction is shown diagrammatically by the arrow 146, and the retraction of the carriage to its starting position is shown diagrammatically by the arrow 148 in FIG. 1.

Referring now to FIGS. 17 through 18a, it will be observed that shaft 42 on which pinion 50 is fixed has a reduced end portion 152 on which pinion 44 is journalled. Pinion 44 is formed integrally with a brake drum 154 which is resiliently engaged by a pair of brake shoes 155. Shoes 155 are hinged together by means of a fixed pivot pin 157, and the pressure exerted by these shoes on the brake drum 154 is adapted to be adjusted by means of a screw 159 and a spring 161. The free end of the reduced portion 152 of shaft 42 has an end plate 156 fixed thereto by means of a dowel pin 158. End plate 156 is in turn connected to brake drum 154 by means of a shear pin 160. A molded fiber ring 162 extends around the periphery of end plate 156. Two space collector rings 164, 166 are arranged thereon and engaged by carbon brushes 168, 170. The carbon brushes are connected by conductors 172 with the control panel of the press, the arrangement being such that as long as a circuit is closed through brushes 168, 170 the motor of the press is capable of being energized. Within the fiber ring 162 there is arranged a pair of spaced apart, axially extending conductors 174, 176. As is illustrated in FIG. 17, conductor 174 is electrically connected with collector ring 164 and conductor 176 is electrically connected with collector ring 166. At the exposed end of fiber ring 162 each of these conductors is electrically connected, as by wires 180 with brass screws 182 (FIG. 18a). Brass screws 182 are mounted in a fiber plug 184 and each screw 182 has associated therewith a spring-pressed carbon brush 186. Within the brake drum member 154 there is arranged a socket member 188 formed of an electrical non-conducting material which carries a brass plug 190. Normally both of the carbon brushes 186 are in contact with the brass plug 199 so that a circuit through the carbon brushes 168, 170 is normally closed through the brass plug 190. However, if for some reason the transfer mechanism encounters an obstruction sufficient to shear pin 160, then the two brushes 186 will rotate out of registration with brass plug 190, thus breaking the circuit to the control panel and stopping the operation of the press.

As an added safety feature, shaft 42 is formed with a pinion 192 which meshes with a second vertically extending gear rack 194. Gear 194 has its upper end 196 terminating at a level just below the lower surface of press ram 12 when the ram is in its lowermost position (FIG. 1). The auxiliary gear rack 194 is thus ineffective to actuate the fingers 28, 36 inwardly toward each other in the clamping direction, should shear pin 160 fracture, but is effective when the press ram moves downwardly to retract the fingers in case shear pin 160 has been broken.

Referring now to FIGS. 19 through 21, a slightly modified form of drive arrangement for the transfer device is there illustrated. In this arrangement, the gear 50 on the drive shaft 42 meshes with an auxiliary gear rack 200 which is slidably arranged within the carriage housing 16. Rack 200 in turn meshes with a gear 202. Gear 202 is formed integrally with a circular crank 204 having a crank pin 206 thereon. A link 208 is connected at one end with crank pin 206 and at its opposite end with a pin 210 on actuator 54a. Actuator bar 54a is fashioned with two spaced gear rack portions 212 and 214. These gear rack portions mesh with pinions 216 which in turn mesh with the gear rack portions 218 and 220 of the finger bar support rods 24, 32, respectively. In other respects the construction shown in FIGS. 19 through 21 is the same as that previously described. The difference in the operation between the transfer device shown in FIGS. 19 through 21, as compared with the operation of the transfer device previously described, is that in the case of the device of FIGS. 19 through 21, the actuator bar itself, namely, bar 54a, is provided with a smooth motion which is transferred through the pinions 216 to the finger bars 26, 34. Thus regardless of the speed with which the drive rack 46 is driven the carriage and fingers are accelerated and decelerated smoothly.

I claim:

1. In a transfer device for indexing workpieces progressively of the type having a support, a carriage mounted for reciprocation on the support, an actuator slidably mounted on the carriage for reciprocation through a predetermined stroke in a path parallel to the path of reciprocation of the carriage and means forming a lost-motion connection between the actuator and the carriage such that the actuator is permitted to slide on the carriage through a predetermined distance and then drive the carriage in one direction on the support and on the reverse stroke of the actuator the actuator slides on the carriage through a predetermined distance and then drives the carriage in the opposite direction on the support, that improvement which comprises a pair of work-engaging members mounted on the carriage for reciprocation in a path extending transversely of the path of travel of the carriage and means including gear and gear rack means interconnecting said work-engaging members with the actuator such that movement of the actuator relative to the carriage causes the two work-engaging members to move simultaneously toward and away from each other in said transverse path, said work-engaging members having aligned portions which are adapted to grip a workpiece disposed therebetween when the work-engaging members are moved toward each other.

2. The combination set forth in claim 1, wherein the last-mentioned means includes a gear rack operably associated with each of said work-engaging members and gear means interconnecting said gear racks such that when one gear rack moves in one direction the other gear rack moves in the opposite direction.

3. The combination set forth in claim 1, wherein said last-mentioned means includes a gear rack operably associated with the actuator, a gear rack operably associated with each of said work-engaging members, gear means interconnecting the actuator gear rack with the gear rack associated with one of the work-engaging members and additional gear means interconnecting the two gear racks associated with the work-engaging members such that when the actuator moves relative to the carriage one of the work-engaging members moves toward the carriage and the other away from the carriage.

4. In a transfer device for indexing workpieces progressively of the type having a support, a carriage mounted for reciprocation on the support, an actuator slidably mounted on the carriage for reciprocation through a predetermined stroke in a path parallel to the path of reciprocation of the carriage and means forming a lost-motion connection between the actuator and the carriage such that the actuator is permitted to slide on the carriage through a predetermined distance and then drive the carriage in one direction on the support and on the reverse stroke of the actuator the actuator slides on the carriage through a predetermined distance and then drives the carriage in the opposite direction on the support, that improvement which comprises a pair of work-engaging members mounted on the carriage for reciprocation in a path extending transversely of the path of travel of the carriage, said work-engaging members each having work-gripping portions which are spaced apart in said transverse direction and which are spaced laterally from the carriage at the same side thereof, means interconnecting the two work-engaging members independently of the actuator such that when one member is caused to move in a direction away from the carriage the other is caused to move in a direction toward the carriage and means interconnecting said actuator with the work-engaging members for moving said work-engaging members in response to movement of the actuator such that when the actuator moves relative to the carriage in one direction the work-engaging members are caused to move toward each other to grip a workpiece positioned laterally at one side of the carriage between said work-gripping portions and when the actuator moves in the opposite direction relative to the carriage the work-gripping portions are caused to move away from one another to thereby release a workpiece gripped therebetween.

5. The combination set forth in claim 4, wherein said means interconnecting the two work-engaging members includes a gear rack operably associated with each work-engaging member, said gear racks being spaced apart in parallel relation and being connected to move with its associated work-engaging member and a fixedly supported gear disposed between and meshing with said gear racks so that when one gear rack moves in one direction the other gear rack is caused to move in the opposite direction.

6. The combination set forth in claim 5, wherein said gear comprises an idler gear and said means interconnecting the actuator with the work-engaging member includes a drive connection between the actuator and one of the gear racks.

7. The combination set forth in claim 6, wherein said drive connection includes a gear rack operably associated with the actuator and movable therewith, a gear meshing with the actuator gear rack, a crank driven by the last-mentioned gear and means connecting said crank with one of said work-engaging members.

8. The combination called for in claim 7, wherein said means connecting said crank and said one work-engaging member comprises a link pivotally connected at one end with said crank and at its other end with the last-mentioned work-engaging member.

9. In a transfer device for indexing workpieces progressively of the type having a support, a carriage mounted for reciprocation on the support, an actuator slidably mounted on the carriage for reciprocation through a predetermined stroke in a path parallel to the path of reciprocation of the carriage and means forming a lost-motion connection between the actuator and the carriage such that the actuator is permitted to slide on the carriage in one direction on the support and on the reverse stroke of the actuator the actuator slides on the carriage through a predetermined distance and then drives the carriage in the opposite direction on the support, that improvement which comprises a pair of work-engaging members mounted on the carriage for reciprocation in a path extending transversely of the path of travel of the carriage, said work-engaging members having work-gripping end portions, a reciprocating drive mechanism including a gear and a crank driven by said gear, means interconnecting the crank and the actuator such that the actuator is reciprocated in response to rotation of said gear, a gear rack operably associated with each of said work-engaging members, said gear racks being spaced apart in parallel relation and being movable one with each of the work-engaging members, a gear disposed between and meshing with said gear racks and means including a gear rack forming a driving connection between the actuator and said last-mentioned gear such that said end portions of the work-engaging members are caused to move toward and away from each other in response to movement of the actuator relative to the carriage.

10. In a transfer device for indexing workpieces progressively of the type having a support, a carriage mounted for reciprocation on the support, an actuator slidably mounted on the carriage for reciprocation through a predetermined stroke in a path parallel to the path of reciprocation of the carriage and means forming a lost-motion connection between the actuator and the carriage such that the actuator is permitted to slide on the carriage through a predetermined distance and then drive the carriage in one direction on the support and on the reverse stroke of the actuator the actuator slides on the carriage through a predetermined distance and then drives the carriage in the opposite direction on the support, that improvement which comprises a pair of arms slidably mounted on the carriage for reciprocation in a path transversely to the path of travel of the carriage, said arms being spaced apart in parallel relation and projecting laterally outwardly from the same side of the carriage, said arms having work-engaging members at the ends thereof projecting outwardly from said one side of the carriage, the work-engaging member on one arm being spaced laterally from the work-engaging member on the other arm, both said work-engaging members being disposed laterally on the same side of the carriage, means interconnecting the arms for movement in unison such that the work-engaging members move toward and away from each other and means interconnecting the actuator with at least one of said arms to reciprocate the arms in response to movement of the actuator relative to the carriage.

11. The combination set forth in claim 10, wherein said last-mentioned means includes a drive gear adapted to be rotated in opposite directions, means including gear rack meshing with said drive gear and connected with said actuator, said gear rack being adapted to shift the actuator in opposite directions in response to rotation of the drive gear in opposite directions.

12. The combination set forth in claim 11, wherein said gear rack is integral with the actuator and said drive gear is mounted to rotate in a fixed journal on the carriage.

13. The combination set forth in claim 12, including a second gear meshing with said gear rack, said means connecting the actuator with said one arm including said second gear, a crank driven by said second gear and a link interconnecting said crank with said one arm.

14. The combination set forth in claim 11, includnig a crank driven by said gear and a link connected at one end with said crank and at the other end with said actuator.

15. A work transfer device comprising a base, a carriage mounted on said base for reciprocation in a rectilinear path, a pair of support arms adjacent each of the opposite ends of the carriage, each of said support arms projecting from the carriage laterally from one side thereof and the outer ends of said arms both terminating at the same side of the carriage, a first work-engaging member secured to one arm in each pair and a second work-engaging member secured to the other arm in each pair, said work-engaging members being disposed laterally on the same side of the carriage and being spaced laterally apart, means for moving the two work-engaging members toward and away from each other in-grip and release workpieces at one side of the carriage arranged therebetween and means for reciprocating the carriage to advance workpieces gripped by the two work-engaging members, said means for moving the two work-engaging members toward and away from each other including gear and rack means interconnecting the two arms in each pair and gear and rack means interconnecting the arms in one pair with the arms in the other pair.

References Cited
UNITED STATES PATENTS

| | | | |
|---|---|---|---|
| 2,929,485 | 3/1960 | Wallis | 198—19 |
| 3,262,595 | 7/1966 | Seip et al. | 214—653 |
| 3,292,798 | 12/1966 | Harper et al. | 214—1 |

GERALD M. FORLENZA, *Primary Examiner.*

F. E. WERNER, *Assistant Examiner.*